United States Patent [19]

Hagerty et al.

[11] Patent Number: 4,747,864
[45] Date of Patent: May 31, 1988

[54] PROCESS FOR THE PRECISION MOLDING OF GLASS ARTICLES

[75] Inventors: Robert J. Hagerty, Painted Post; Paul I. Kingsbury, Elmira; Harold G. Shafer, Jr., Rock Stream, all of N.Y.

[73] Assignee: Corning Glass Works, Corning, N.Y.

[21] Appl. No.: 875,946

[22] Filed: Jun. 19, 1986

[51] Int. Cl.⁴ ............................................. C03B 23/00
[52] U.S. Cl. ................................. 65/102; 65/374.11; 65/374.13
[58] Field of Search ............... 65/66, 374.13, 374.11, 65/102, 104, 106, 308; 264/337; 249/114 R, 134, 135; 427/133, 135; 106/38.9, 38.28, 38.2

[56] References Cited

U.S. PATENT DOCUMENTS

| | | | |
|---|---|---|---|
| 3,244,497 | 4/1966 | Copeland | 65/308 X |
| 3,964,937 | 6/1976 | Post | 427/255.7 X |
| 4,120,930 | 10/1978 | Lemelson | 427/133 X |
| 4,139,677 | 2/1979 | Blair | 65/66 X |
| 4,362,819 | 12/1982 | Olszewski | 65/66 X |
| 4,481,023 | 11/1984 | Marechal | 65/106 X |
| 4,546,951 | 10/1985 | Boschman | 249/135 X |

FOREIGN PATENT DOCUMENTS

| | | |
|---|---|---|
| 3443607 | 6/1985 | Fed. Rep. of Germany . |
| 56-45830 | 4/1981 | Japan ................... 65/374.11 |
| 60-118638 | 6/1985 | Japan . |

Primary Examiner—Kenneth M. Schor
Attorney, Agent, or Firm—Kees van der Sterre

[57] ABSTRACT

Glass products such as glass lens elements are formed by an improved direct molding process at glass viscosities in the range of $10^8$–$10^{12}$ poises. Selected moldable alkali aluminofluorophosphate optical glasses are pressed to an optical surface finish in air utilizing an optically smooth titanium nitride molding surface, the surface being provided, for example, as a surface coating on a stainless steel mold or on a nickel chromium alloy mold supporting an electroless nickel base coating.

4 Claims, 1 Drawing Sheet

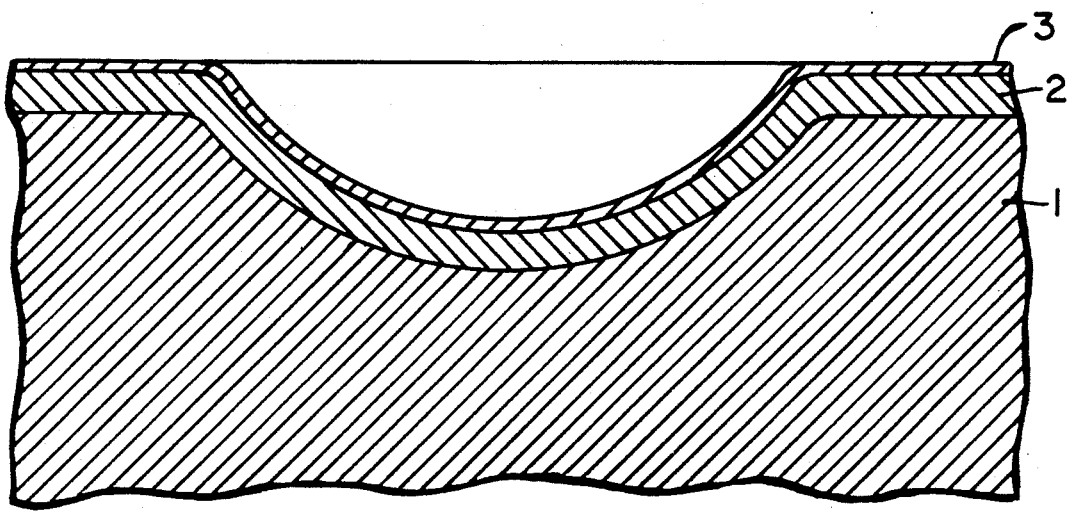

PROCESS FOR THE PRECISION MOLDING OF GLASS ARTICLES

BACKGROUND OF THE INVENTION

The present invention relates to a process for the precision molding of glass articles such as glass lenses. More particularly, the invention relates to improved mold materials permitting the direct molding of precision glass lenses from selected directly moldable optical glass compositions at economical rates without undue mold wear or other deterioration of the surface quality of the molds.

Precision optical elements such as optical lenses generally require refracting surfaces of precise configuration and a high degree of surface smoothness. Moreover, opposing surfaces of the optical elements must be precisely aligned in order to provide the optical focusing characteristics required for a particular end use.

Precision optical elements of glass are presently made using a multistep process wherein a molten glass batch for a glass having the required refractive index and other characteristics is first melted to provide molten optical glass. A suitable charge of such glass is then formed by pressing or other conventional process to yield a lens shape approximating the desired final shape for the product.

Conventional pressing processes do not readily provide a lens having a surface figure and surface finish suitable for direct optical use. Rather, the lens must first be annealed to relieve internal stresses and insure refractive index homogeneity, and then conventionally ground and polished to achieve the final lens configuration and surface smoothness.

Conventional grinding and polishing processes are subject to fundamental limitations as to the surface profiles which may be obtained. The surface profiles that can be produced by conventional machine grinding and polishing techniques are normally restricted to conic sections, such as flats, spheres, and parabolas. Other shapes and, in particular, general aspheric surface configurations, are difficult to form by such grinding. In addition, it is difficult to polish a ground surface having a pre-established surface figure to obtain the necessary optical finish without altering the pre-established surface configuration and thus changing the optics of the lens.

For these reasons, the production of glass aspheric lenses by conventional techniques requires highly skilled and expensive hand working. Critical aspects of this procedure include obtaining the necessary surface finish by grinding and/or polishing without causing some misalignment of opposing aspheric surfaces of the lens, and holding surface figure (shape) through any necessary surface finishing. Either of misalignment or loss of figure renders the finished lens useless for the intended application.

These difficulties have been recognized and the art is well aware that direct molding of aspheric lenses to a surface-finished state could theoretically eliminate the grinding, polishing, and edging which so greatly add to the cost of aspheric lenses. This approach has already proven practicable for plastic lenses. However existing plastics suitable for optical applications are available only in a limited refractive index and dispersion range. Furthermore plastics are subject to damage via scratching, yellowing, and haze. And, the use of compatible abrasion-resistant and/or anti-reflective coatings on plastic lenses has not fully met the need for a durable, stable lens material.

Plastic lenses are also prone to distortion from mechanical force, humidity, and heat. Hence both the volume and refractive index of common plastics can vary substantially with changes in temperature, thereby limiting the useful temperature range within which the lens will function according to optical design criteria.

Because of these shortcomings, repeated attempts to provide finished optical surfaces by the direct pressing of hot glass have been made. However, several fundamental difficulties must be overcome before the direct pressing of glass lenses can be achieved. For example, conventional glass pressing processes typically produce chill wrinkles in the pressed surface in the product and/or surface irregularities deviating from the figure of the molding surface.

A number of techniques have been developed to correct the shortcomings of conventional hot glass pressing processes. Among these are special pressing apparatus utilizing isothermal pressing, i.e., pressing using heated molds and preheated glass so that the temperatures under which the pressing step is carried out vary only slightly across the glass preform during the pressing interval. Special materials to construct the molds and special glass compositions and molding process parameters have also been developed in attempts to improve the quality of direct-pressed lenses.

U.S. Pat. No. 3,244,497 describes a lens blank molding apparatus wherein a temperature-controlled plunger and an insulated mold base offering controllable heat transfer to a supporting press table are described. However the apparatus is designed for the pressing of relatively thin lens blanks, this factor being an important contributor to the temperature control attainable with the apparatus. U.S. Pat. No. 4,481,023 describes alternative molding apparatus for the direct pressing of lenses of optical quality. Again, temperature control of the molding surfaces is provided, and the apparatus is designed for pressing at rather high glass viscosities of $10^8$–$10^{12}$ poises. This corresponds to a relatively low pressing temperature, which helps to reduce difficulties stemming from non-uniform heat flow.

The use of mold coatings to enhance the surface quality of the pressings, to improve mold durability, and to act as a parting agent from the molten glass is suggested in U.S. Pat. No. 3,244,497, supra. Refractory coatings selected from the group consisting of refractory nitrides, borides, carbides, and oxides are suggested. Coatings no thicker than approximately half the wavelength of visible light, e.g. 0.5 microns, are suggested in order that the coating faithfully reproduce the mirror finish of the underlying mold surface.

U.S. Pat. No. 4,168,961 describes a method for the precision molding of optical glass elements wherein a mold having molding surfaces of a silicon carbide-/glassy carbon mixture is proposed. The patent suggests that glass elements molded against this material exhibit high surface quality and surface accuracy. However molding under a controlled atmosphere is required to avoid oxidation of this material, a circumstance which substantially reduces the practical economic value of the method.

U.S. Pat. No. 4,139,677 proposes the precision molding of optical glass elements in a mold having molding surfaces formed of silicon carbide or silicon nitride.

This method also reportedly provides good surface quality and configuration but, again, an oxygen-free atmosphere within the molding chamber must be maintained to avoid oxidation of the mold coatings.

In order to realize the economical advantages of direct molding for products such as aspheric lenses, factors relating to the service life of the molds employed for the pressing operation must be taken into account. The machining of aspheric shapes in molds makes them relatively expensive, particularly since very hard and durable mold materials are generally required. This is especially true for molding processes involving low-temperature, high viscosity molding, because of the higher molding stresses involved.

Primary factors affecting mold life include chemical reactions occurring between the hot mold and the molten glass, and between the hot mold and the atmosphere. The latter factor is particularly significant when rapid production rates prohibiting cooling of the shaped lens in the mold are desired. And, as previously noted, while prior art approaches have suggested the use of a controlled atmosphere for molding to avoid oxidation or other degradation of the mold surface, such a limitation is inconsistent with rapid and economical lens production.

The development of direct lens molding in glass has been substantially aided by the discovery of new glass compositions which can be molded at relatively low pressing temperatures, yet which are not subject to attack by moisture in the manner usual for soft glasses. U.S. Pat. No. 4,362,819 discloses examples of alkali aluminofluorophosphate glasses useful for such applications. However, the pressing of such glasses at economical rates has been difficult because of limited compatibility between these glasses and conventional mold materials.

It is therefore a principal object of the present invention to provide a mold construction and molding process which can be practiced in a normal air atmosphere yet which will provide long mold lifetime due to the high wear resistance and high chemical resistance of the mold surface to hot glass.

It is a further object to provide a mold construction which can be used in a low-temperature, high viscosity, high pressure process.

It is a further object of the invention to provide a mold construction and molding process useful to make aspheric glass molding elements closely matching a selected aspheric surface figure and providing pressed glass elements of accurate surface figure and good surface finish.

It is a further object of the invention to provide a mold construction and a molding process which can be used to directly form optical surface figures and optical finishes on lens elements formed of moldable alkali aluminofluorophosphate glass compositions or the like which have shown particularly advantageous properties for the production of molded optical elements.

Other objects and advantages of the invention will become apparent from the following description thereof.

SUMMARY OF THE INVENTION

The present invention provides a method for directly pressing optical elements wherein a mold comprising a glass contact surface composed of TiN (hereinafter a TiN glass contact surface) is used to form a surface of optical quality on a molded glass element. Suitably, such titanium nitride glass contact surfaces are provided as titanium nitride coatings on the pressing surfaces of steel or alloy molds. Alternatively, mold inserts or other mold elements formed of sintered titanium nitride could be employed. The formed surface may be flat, or spherically or aspherically curved.

Titanium nitride offers substantial advantages over other candidate mold materials for use in the direct molding of optical elements. First, this compound is resistant to oxidation in air at temperatures up to at least 400° C., which means that for use in molding glasses at such temperatures it can be employed without providing for a protective or neutral atmosphere in the molding chamber.

Secondly, titanium nitride has been found to exhibit good resistance to corrosion by fluorophosphate optical glasses of the kind presently being developed for molded optical elements. Thus, the incidence of mold corrosion due to contact with hot fluorophosphate glasses is substantially reduced with this molding material.

Thirdly, titanium nitride is compatible not only with steel mold base materials, but also with other base materials such as nickel alloys, steel alloys, and free-machining metals such as aluminum and electroless nickel plating compositions. This means that TiN coatings can be smoothly applied over machined surfaces of such base materials, a characteristic which is particularly important for the manufacture of aspheric lenses.

Other characteristics exhibited by titanium nitride which render it particularly suitable for use in the direct molding of optical elements include the capability of being directly applied in near-optical quality with minimal surface distortion and defects. Thus TiN inserts or, preferably, coatings can be provided with sufficient surface smoothness such that the surfaces of glass lenses produced by pressing against the finished TiN surface exhibit low surface scattering. Such lenses can therefore be used without further optical finishing.

Titanium nitride is also sufficiently hard and strong that coatings formed of this material resist wear, cracking, and stress deformation through repeated exposure to hot glass in the pressing operation. Thus titanium nitride extends the useful life of expensive, optically finished molds such as are used in the direct manufacture of pressed optics. This is particularly important in that precise surface figure in the pressed glass surface, i.e. a surface figure conforming to a target surface figure to within 0.1 wavelengths (RMS), can be maintained during prolonged mold use.

The invention therefore offers a substantial improvement in conventional processes such as described, for example, in U.S. Pat. No. 4,481,023, comprising the known steps of preheating the mold and a glass preform for an optical element to a temperature providing a glass viscosity of $10^8$–$10^{12}$ poises and pressing the optically finished mold against the glass preform to conform the glass to the optical mold surface. Using a TiN glass contact surface coating on the pressing surface of the mold and an oxidation resistant metal for the mold base according to the invention permits the process to be carried out in air, and with a very low incidence of mold deterioration due to oxidation or hot glass corrosion.

Mold configurations useful in accordance with the invention may include not only TiN-coated glass contact surfaces for improved long term performance, but can also comprise one or more base coatings on the curved pressing surface of the mold to provide the desired support and accurate surface figure for the over-applied TiN surface coatings useful for direct-optics-pressing applications. The base coating is a freely machinable metal coating which preferably also exhibits high hardness. A freely machinable metal is one in which an optically finished surface figure may be generated by machining processes such as single-point diamond turning.

The invention further comprises a method for providing a glass-forming mold for the direct pressing of low-scattering optical surfaces onto glass wherein a glass pressing surface is first machined in a metallic mold blank and provided with a machinable base coating. This base coating is then machined to final surface figure and optical finish, and is covered by a TiN glass contact surface coating. This process is particularly advantageous in the construction of aspheric molds for the pressing of aspheric optical surfaces in glass.

DESCRIPTION OF THE DRAWING

The invention may be further understood by reference to the Drawing, which is a schematic elevational view in cross-section, not to scale, of a coated glass-forming mold useful in accordance with the invention.

DETAILED DESCRIPTION

While it has been theorized that the production of pressed optical elements of optical quality by the direct pressing of the glass into finished lenses will be more economical than conventional processes for the production of glass optical elements, the economics of the former process will be dictated largely by the process life exhibited by the molds used for direct-pressed optics. Hence, even in conventional practice, the manufacture of these molds requires, first, that a final lens surface figure such as a sphere or asphere be machined into the mold body. This will include obtaining the necessary surface finish on the molding surface of the shaped mold by grinding and polishing. Further, one or more protective, glass-release or wear coatings must be applied to the finished surface, and those coatings, if applied, may also require finishing to optical smoothness.

It can readily be appreciated that such processing is much more expensive than conventional mold fashioning techniques. Thus, if a mold cannot be provided with extended service life, the economics of direct pressing processes cannot be realized.

The service life of molds of this type is considered to be dictated primarily by two chemical reactions: that reaction occurring between the glass contact surface of the mold and the hot glass, and that occurring between the heated contact surface and the atmosphere. To be suitable for the repeated pressing of surfaces of optical quality on hot glass, a selected mold material must obviously exhibit low reactivity under these conditions in order to resist corrosive deterioration which would deleteriously affect the surface quality of the mold. And of course the surface must be sufficiently durable to resist physical surface deterioration and wear from repeated glass contact.

Among the specific materials which have been proposed for use as molds or mold surfacing materials in the prior art are vitreous carbon coatings, silicon carbide coatings, and silicon nitride coatings. Unfortunately, these particular materials are subject to high temperature oxidation in air, and thus can be used only where a provision for an inert atmosphere in the molding chamber has been made. Hence, while the molded surfaces which can be produced using these materials are initially of optical quality, rapid deterioration of the mold material through oxidation, with a concomitant reduction in the surface quality of the pressings, can rapidly occur in the absence of a protective atmosphere.

Another material which has been proposed for use as a mold or mold surface is fused silica. Fused silica exhibits excellent resistance to oxidation in air, but does not exhibit the requisite strength and durability for long term use as a mold surfacing material. Thus cracking of the fused mold or mold surface is a frequent problem observed using fused silica for these applications.

Of course the capability of supporting an optically acceptable surface finish is indispensible in selecting a mold material for the direct pressing of lens optics. The surface finish or smoothness of a mold surface can be measured mechanically with commercially available profilometers. The mold surface can also be indirectly evaluated by examining the light-scattering characteristics of the surfaces of pressed glass elements produced therefrom. Quantitative determinations based on the latter evaluations utilize a surface scatter ratio, which is simply a measure of the amount of light scattered away from the focus of a pressed lens element due to imperfections in the pressed lens surface.

Experience indicates that providing a mold surface having a surface roughness not exceeding about 0.2 microinches AA (arithmetic average) is required to bring the scatter ratio of a pressed optical lens element to an acceptable level, and this is considered, for the purpose of the present description, to constitute an optically finished mold surface. Also for the purpose of the present description, a surface scatter ratio not exceeding about 3% (per surface) is considered acceptably low light scattering for most lens applications. However, it has been demonstrated that mold surface smoothness does not correlate exactly with the observed lens surface scatter ratio, but rather varies in unpredictable ways depending upon the particular mold material selected. Thus the suitability of each prospective material for use as a molding surface must be evaluated in each case by actual trial of the material in the molding process environment.

The wear resistance necessary in a candidate mold or mold surfacing material in order to render it suitable for use for direct lens pressing depends principally on the hardness of the material. However hardness alone is not sufficient to render the material useful, since strength sufficient to resist yielding under the molding process, and to resist cracking during pressing, must also be present. The strength of the material is particularly critical in molding processes which must be carried out at relatively low temperatures, since somewhat higher glass viscosities necessitating higher forming pressures are encountered. The ability to retain shape in the mold body is particularly critical for aspheric pressing, since reshaping of the pressed surface to the desired figure after mold-forming cannot economically be carried out.

Within the foregoing limitations we have found that a titanium nitride coating deposited on a suitable metallic base provides a particularly desirable pressing surface for use in the direct molding of moldable optical glasses such as the fluorophosphate glasses. The titanium nitride coating material has been found to be relatively inert in contact with hot optical glass of this type at temperatures up to at least 400° C., while at the same time being relatively inert to air oxidation at these temperatures.

Further, titanium nitride coatings can be provided with an optical finish of 0.2 microinches AA, which we have found sufficient to produce lens elements with low scatter ratios from molds formed of this material under pressing conditions suitable for the direct shaping of optical elements from these glasses. Thus scatter ratios between 1.0–2.3% have been attained with selected optical glasses using molds comprising titanium nitride surface coatings.

It has also been found that the observed lens scatter ratios increase only moderately over the course of multiple pressings using titanium nitride-surfaced molds, and that only minimal changes in surface figure from the initially generated surface profile. Nor is any significant visual degradation of the titanium nitride surface film due to either glass contact corrosion or air oxidation commonly observed during the course of such molding.

Of critical importance is the fact that the foregoing characteristics are retained not only when the TiN coatings are directly supported on relatively hard base materials such as steel or nickel chromium alloys, but also when the coatings are supported on freely machinable base materials such as electroless nickel plate. The latter materials constitute preferred base components for aspheric glass mold fabrication because they are relatively hard, yet can be precision-machined to an exact preselected aspheric curvature by machining processes such as single-point diamond turning (SPDT).

For spherical lens pressing and other simple pressing applications, therefore, the invention contemplates the use of TiN glass contact surface coatings directly on steel or alloy molds. The preferred mold configuration for the production of glass aspheric lenses or other glass pressings of complex shape, however, comprises a TiN glass contact surface coating supported by a machinable material such as electroless nickel plate. Most preferably, the machinable material will be provided as an SPDT-machinable facing material on a suitable metallic mold, with that facing being covered, after generating the required surface figure thereon, with a titanium nitride glass contact surface coating.

Suitable materials from which to form a mold blank for use as direct support for a titanium nitride mold surfacing coating include steel alloy compositions such as tool or stainless steels. The 400 series stainless steels, for example, such as 420M STAVAX TM stainless steel, exhibit the requisite hardness and toughness for use as a mold base while being suitable for the direct application of titanium nitride coatings by physical vapor deposition (PVD) or other suitable coating processes.

Where machinable electroless nickel facing materials are to be used for glass mold fabrication, nickel-chromium alloys such as the Inconel TM alloys constitute the preferred material for mold base fabrication. These exhibit good electroless nickel plating characteristics together with adequate hardness and machinability for basic shaping.

The preparation of a mold for use in the direct pressing of optical quality surfaces according to the invention typically involves the preliminary steps of machining a pressing surface on a mold blank to approximate final shape, then heat treating to obtain hardening of the steel or alloy surface, and thereafter finishing the pressing surface to the requisite spherical or aspheric shape and to the desired optical finish. Where spherical molds are to be used, so that diamond point shaping is not required, conventional finishing equipment and materials can be used for rough grinding and final polishing. Using conventional grinding and polishing procedures permits the finishing of a stainless steel mold base to a surface roughness of 0.2 microinches (AA) without undue difficulty, which is sufficiently smooth for direct application of a TiN glass contact surface coating to the finished steel surface.

Where an aspheric molding surface is required, single point diamond turning will preferably be used for simultaneously obtaining accurate generation of a preselected aspheric surface figure and a surface finish which does not require significant additional polishing. Loss of surface figure is probable if significant polishing of a precision generated surface is needed.

The preferred base mold material for aspheric molding is nickel chromium alloy, e.g. Inconel TM 718 alloy. After conventional preliminary shaping and heat treatment for surface hardening, the pressing surface of this material is processed to roughly generate the preselected aspheric surface figure by machining with hard tooling such as a cubic boron nitride tool. Thereafter, a finely machinable facing layer such as a plated electroless nickel coating is applied to the machined surface and heat treated. The final surface figure and finish are then generated by diamond turning of the electroless nickel plated coating.

Following the finishing of the nickel coating a TiN glass contact layer is applied over the nickel coating in the same manner as for an uncoated steel mold. This application does not significantly degrade the surface finish of the mold, nor is surface figure adversely affected. If necessary any surface asperities in the deposited TiN coating which might cause glass sticking can be removed by very light polishing.

The application of suitable TiN coatings to steel, steel alloy, nickel-chrome alloy, or nickel plated mold pressing surfaces is conveniently accomplished by physical vapor deposition (PVD) processes such as plasma deposition. The thickness of the titanium nitride film is important; it must be thick enough to withstand a reasonable amount of operating wear and corrosion without penetration, but not so thick as to result in deterioration of the underlying surface figure. Coating thicknesses in the range of about 0.1–5 microns are suitable, with preferred coating thickness being 0.2–2 microns.

Molds produced as described are uniquely suited to the production of precision glass lens elements from aluminofluorophosphate optical glasses of the kind recently developed for the production of molded optics. These are glasses which can be molded at temperatures below 400° C. to an optical finish, yet which exhibit good chemical durability and resistance to weathering along with relatively good glass stability. Glasses of this type typically comprise, in weight percent, about 30–75% $P_2O_5$, about 3–25% alkali metal oxides selected from the group $Li_2O$, $Na_2O$, and $K_2O$, about 3–20% $Al_2O_3$, and about 3–24% F. Optional constituents which may be present in these glasses include, in the indicated weight percent proportions, up to about 60% PbO, up to about 40% total of alkaline earth metal oxides selected from the group MgO, CaO, SrO, and BaO, up to about 40% of ZnO, and up to about 30% CdO. These glasses preferably have a high atomic ratio of fluorine to aluminum, such atomic ratio typically being in the range of 0.75–5. Particularly preferred glasses of this type are disclosed in U.S. Pat. No.

4,362,819, and reference may be made to that patent for a more detailed description of these glasses.

The invention may be further understood by reference to the following examples, which are intended to be illustrative rather than limiting.

EXAMPLE I

A mold for the direct pressing of small glass lens elements having a spherical focusing surface of optical quality is prepared from a cylindrical mold blank consisting of 420M stainless steel. A spherical segment cavity is first lathe-machined into the pressing surface of the mold blank using conventional tooling. The cavity has a depth of approximately 0.053 inches with a radius of curvature of approximately 0.2656 inches. The machined mold blank is next heat treated to a hardness of approximately 52 Rockwell 'C' (RC) and is then conventionally ground and polished to provide an optically finished pressing surface on the mold. A surface roughness not exceeding about 0.2 microinches (AA), as determined by standard profilometry, is obtained.

A titanium nitride coating is next applied to the finished surface of the stainless steel mold by a conventional plasma deposition process. The thickness of the deposited titanium nitride film is approximately 2 microns. Finally, the titanium nitride film is given a very light final polish with diamond paste (approximately ½ micron) to remove any surface irregularities resulting from the vapor plating process.

The mold thus provided is utilized as the top mold in a conventional hydraulically operated glass molding press. The TiN-coated top mold is fitted to the bottom end of the upper press plunger, the plunger having sufficient vertical travel to move the mold into a bottom molding cavity on the press table. The bottom surface of the molding cavity is formed by a stainless steel bottom mold and the cavity sidewalls are formed by a tungsten carbide sleeve, having an inner diameter closely matching the outer diameters of the two molds.

Induction heating means are provided to permit preheating of the molding assembly, consisting of the top and bottom molds and carbide sleeve, while air convection is relied on for cooling of the assembly. The temperature of the mold assembly is monitored by a thermocouple inserted into the base of the bottom mold.

A small charge of an alkali fluoroaluminophosphate glass is dropped into the molding chamber for pressing. The composition of the glass is approximately 41.4% $P_2O_5$, 2.1% $Li_2O$, 20.9% BaO, 5.5% $Al_2O_3$, 4.7% $Na_2O$, 24.5% PbO, and 5.2% F. The charge is a glass preform of this composition consisting of a small glass cylinder with spherically ground ends, the preform being formed by casting from a conventionally melted glass batch for that glass.

The mold assembly and glass charge are next heated by means of the induction heater to a temperature of approximately 381° C. and are soaked at that temperature for two minutes to attain thermal equilibrium of the glass and mold components. This temperature corresponds to a glass viscosity of approximately $10^9$ poises for the particular glass composition employed. Thereafter a force of approximately 100 pounds is hydraulically applied to the top mold and maintained for a pressing interval of two minutes. The force is then released, the molded lens element is held in the mold for approximately 4 minutes, and the element is ejected from the mold at a temperature of about 328° C. Finally, the pressed glass article is cooled on a ceramic plate for an additional 4 minutes and then annealed at approximately 310° C. An ambient air atmosphere surrounds the mold assembly during the entire pressing operation.

An examination of the pressed lens produced by the above procedure indicates a scatter ratio from the the pressed lens of approximately 1%. Further pressings are thereafter produced using the same top mold, and the scatter ratios of approximately 100 lenses produced by the titanium nitride-coated top mold are evaluated. Scatter ratios for this group of lenses are found to be in the range of about 1.0–2.2%, indicating that the pressed top surfaces of these lenses are of an optical quality sufficient for use without further grinding or polishing. Further, no degradation of the surface figure of the mold in the course of this pressing run is observed.

Examination of the coated mold in the course of the pressings used to evaluate the surface properties of the pressed lenses indicate very little deterioration of the pressing surface. Slight discoloration of the titanium nitride coating occurs after approximately 50 pressings, but surface roughness does not exceed 0.2 microinches (AA) at any point in the pressing run. No significant glass adherence to the mold pressing surface is observed, nor are any cracks, pinholes, or other discontinuities seen to form in the coating.

Other candidate mold materials proposed for use in the direct molding of glass optical elements have been found unsatisfactory for the production of pressed lenses from fluorophosphate glasses of the kind hereinabove described. Included among the materials tested for this application are sintered silicon carbide and silicon nitride, polished stainless steel, tungsten carbide, titanium/zirconium carbide, and fused silica.

The results of pressing runs on the optical glass utilized in Example I above for each of a number of these candidate mold materials are reported in Table 1 below. Included in Table 1 for each of a number of these materials are an identification of the material forming the mold surface, the conditions under which molding was carried out, including the preheating temperature for the molds and glass preform, 24 in °C., the molding force, and the molding atmosphere. Also reported for each of the candidate materials is an indication of the appearance of the mold surface after pressing of a number of lens samples, and the range of scatter ratios observed for the number of sample lenses produced using each of the mold materials.

TABLE I

| Mold Surface Material | Mold Preheat (°C.) | Molding Force (pounds) | Molding Atmosphere | No. of Pressings | Mold Surface Appearance | Lens Scatter Ratio |
| --- | --- | --- | --- | --- | --- | --- |
| $SiO_2$ | 391° | 60 lbs. | $H_2$(8%)—$N_2$ | 125 | early cracking some corrosion | 1.4–2.0% (72 lenses) |
| $SiO_2$ | 382° | 60 lbs. | Air | 24 | early cracking bright spots | 0.7–1.5% |
| TiC—SiC | 374° | 100 lbs. | Air | 7 | mold cracking | not measured |
| SiC | 379° | 100 lbs. | Air | 15 | slight discoloration | 8.0–14.0% |
| WC | 376° | 100 lbs. | Air | 100 | slight discoloration; | 1.0–1.7% |

TABLE I-continued

| Mold Surface Material | Mold Preheat (°C.) | Molding Force (pounds) | Molding Atmosphere | No. of Pressings | Mold Surface Appearance | Lens Scatter Ratio |
| --- | --- | --- | --- | --- | --- | --- |
| MO | 372° | 100 lbs. | H$_2$(8%)—N$_2$ | 47 | mold surface corrosion surface pitting; glass adherence | 1.9–4.0% |
| Inconel 718 | 369° | 100 lbs. | H$_2$(8%)—N$_2$ | 100 | surface roughness; glass adherence | 1.6–6.0% |

As is evident from a study of the data reported above in Table 1, each of the candidate materials proposed for pressing moldable fluorophosphate glass compositions in accordance with the present process exhibited some deterioration during molding and/or produced lenses exhibiting surface scattering ratios which were well in excess of 2%. Thus TiN demonstrates unique suitability for the optical pressing of glasses of this type.

EXAMPLE II

The lens pressing procedure of Example I is repeated utilizing both upper and lower spherical molds formed of stainless steel and incorporating plasma-deposited TiN coatings. The top mold has the configuration described in Example I, while the bottom mold has a spherical cavity 0.011 inches in depth with a radius of curvature of 0.375 inches. The TiN coatings are applied to a thickness of approximately 2 microns, and are lightly polished as in Example I to obtain a surface finish with a roughness not exceeding approximately 0.2 microinches (AA).

The molds thus provided are utilized to press a series of 1500 glass lenses from the glass composition of Example I. Lens scatter ratios are generally maintained below 2.0% during the entire pressing run, except for two episodes of higher scatter ratio caused by mold contamination from contaminated preforms. These are easily corrected by cleaning the molds with HCL. Extrapolation of the scatter ratio data indicates a projected mold life of between 4000–5000 pressings before mold reworking would be required.

EXAMPLE III

A spherical glass lens mold is provided by machining and coating a steel alloy mold base. The mold base material consists of H-13 tool steel, wherein a spherical mold cavity is machined by conventional methods. The mold base is then heat treated to obtain a hardened surface and the mold cavity is finished by conventional grinding and polishing.

After the spherical cavity has been suitably finished, an electroless nickel plating layer is applied by conventional procedures. The electroless nickel plating formulation is commercially available from Inthone, Inc. of West Haven, Conn., as Enplate NI-415 plating solution, and provides a coating with a maximum thickness of about 5 mils on the finished pressing cavity of the mold.

The coated mold thus provided is finished to a final spherical figure by single point diamond turning (SPDT) on commercially available diamond turning equipment. The turning process provides a surface figure which matches a perfect spherical surface figure to within approximately 0.03 light wavelengths (RMS) as measured with 6328 Å He-Ne laser light. The surface exhibits a surface roughness not exceeding 0.2 microinches (AA).

The plated mold thus provided is then subjected to a commercial plasma vapor deposition process wherein a TiN surface film is applied over the finished electroless nickel coating. The TiN film is applied to a thickness of approximately 1 micron, and matches the surface figure and smoothness of the machined electroless nickel coating except for isolated surface asperities introduced by the vapor plating process. These are largely removed by light polishing with ½-micron diamond paste.

The mold thus provided is used as a top pressing mold in combination with a bottom mold provided as described in Example II, comprising a spherical 420 M stainless steel mold base supporting a TiN surface coating, to press a series of approximately 1500 spherical glass lenses. The glass composition and glass pressing conditions described in Example I are used for the pressing run.

The lenses produced during this pressing run are analyzed for surface smoothness and surface figure conformity. Lens surface scatter ratios are maintained below 2.5% (per surface) throughout the duration of this run. In addition, it is found that the surface figures of both the top mold pressing surface and the lens top surfaces change only gradually throughout the run. The mean deviation of mold surface figure from spherical surface figure measured during this run is 0.037 wavelengths (RMS), while the mean lens deviation from spherical is 0.047 wavelengths (RMS). Thus machinable electroless nickel plating is found to exhibit excellent compatibility with both the fluorophosphate glass pressing process generally and the TiN glass contact surface coating in particular.

EXAMPLE IV

The top mold preparation procedure described in Example III is repeated to produce a pair of spherical molds of similar size and configuration, but utilizing nickel chromium alloy mold blanks to provide the top and bottom molds for direct lens pressing. The alloy selected for use as the mold blank material is Inconel ™ 718 alloy.

Each mold is produced by first machining a spherical cavity in the mold blank by conventional methods. The shaped mold blank is next heat treated to achieve surface hardening, and surface-finished by lapping.

The machined cavity in the shaped mold blank thus produced is next provided with a finely machinable electroless nickel surface coating using the plating composition and procedure described in Example III, the nickel coating having a maximum thickness of about 5 mils. This coating is then finished to a preselected final spherical configuration, and final surface finish, by SPDT processing as employed in Example III. The surface figure of the diamond-turned mold pressing surface of the bottom mold matches the preselected spherical surface figure to within 0.035 wavelengths (RMS), while the top mold matches its designed spherical surface profile to within 0.054 wavelengths (RMS).

The SPDT surfaces of these molds do not exceed surface roughness values of 0.2 microinches (AA).

Protective TiN glass contact coatings approximately 0.5 microns in thickness are next applied over the machined electroless nickel plating layers of each mold by plasma deposition. Surface smoothness not exceeding about 0.2 microinches is retained, except for a number of surface asperities introduced during plasma coating which are substantially removed, as in Example III, by light finishing with ¼-micron diamond paste.

Measurements of mold surface profiles after TiN coating of these molds indicate only small changes in surface figure during coating. The top mold exhibits variations not exceeding about 0.062 wavelengths (RMS) from the target profile, while the bottom mold profile matches the design to within 0.028 wavelengths (RMS).

A schematic elevational view in cross-section of a coated mold provided as above described is shown in the drawing. In this view, not to scale, the machined pressing surface of the nickel chromium alloy mold 1 is provided with a base coating 2 consisting of the electroless nickel plating layer. This nickel layer supports a glass contact surface coating 3 consisting of plasma-deposited TiN.

A glass pressing run of 100 cycles is carried out using this mold set following the molding procedures described in Example I. No significant increases in the surface scatter ratios of the pressed spherical lenses are observed during the pressing run, the measured scatter ratios averaging about 2.3%.

The mold design and fabrication procedures of this Example IV and the following Example V are presently the most preferred for providing spherical or aspheric molded glass optical elements in accordance with the invention.

EXAMPLE V

The mold fabrication procedure of Example IV is repeated, except that aspheric mold cavities rather than spherical mold cavities are generated in the molds. Suitable cavities are first machined into the nickel chromium alloy top and bottom mold blanks, after which electroless nickel plating and TiN vapor coatings are applied to the pressing surfaces of each mold as described in Example IV. The electroless nickel diamond turning procedure follows that of Example IV except that an aspheric surface figure is generated, and the over-applied TiN coating is deposited to a thickness of approximately 0.6 microns.

A series of 35 aspheric lenses is produced employing these aspheric top and bottom molds, using the glass composition and pressing procedure of Example I. It is found that the surface scattering ratios of the pressed lenses generally fall below 1.57%, and that the pressed lenses exhibit surface figures which are within 0.036 wavelengths (RMS) of the aspheric top and bottom target profiles selected for the lens design.

We have thus found that titanium nitride appears uniquely well suited for use as a surfacing material for molds to be utilized in the direct pressing of optical elements, particularly where fluorophosphate optical glasses are to be used for the production of the lenses. The TiN mold material clearly exhibits significant advantages in terms of surface stability and molding surface quality over competitive mold materials utilized in the prior art for direct-molded optics, particularly when applied over base materials which have been previously optically finished.

Of course the foregoing description and examples are merely illustrative of the invention, and it is expected that numerous variations and modifications of the principles and procedures hereinabove described may be resorted to by the skilled art worker within the scope of the appended claims.

We claim:

1. In a method for molding a glass optical element having at least one curved optical surface exhibiting a precise surface figure and low light scattering, which method comprises the steps of providing a glass forming mold having a pressing surface provided with a TiN surface coating and corresponding to the optical surface, preheating the mold and a glass preform for the glass optical element to a temperature at which the glass has a viscosity in the range of $10^8$–$10^{12}$ poises, and pressing the mold against the preheated glass preform with pressure sufficient to conform a surface of the preform to the pressing surface of the mold, the improvement wherein:
   (a) the mold comprises a base member formed of an oxidation resistant metal;
   (b) a surface of the base member corresponding to the pressing surface of the mold is provided with a machinable nickel base coating;
   (c) the nickel base coating is provided with a TiN glass contact coating;
   (d) the glass preform consists of an alkali fluoroaluminophosphate glass; and
   (e) the step of pressing the mold against the preheated glass preform is carried out in air.

2. A method in accordance with claim 1 wherein the TiN glass contact surface coating is a vapor-deposited coating having a thickness in the range of 0.1–5 microns and a surface roughness not exceeding 0.2 microinches.

3. A method in accordance with claim 2 wherein the machinable nickel base coating is an electroless nickel plating layer having a thickness in the range of 0.001–0.005 inches.

4. A method in accordance with claim 3 wherein the mold is formed of an oxidation resistant steel, steel alloy, or nickel-chromium alloy,

* * * * *